United States Patent
Wakasugi et al.

(10) Patent No.: US 12,527,893 B2
(45) Date of Patent: Jan. 20, 2026

(54) STRUCTURE REINFORCING MATERIAL

(71) Applicant: GUNZE LIMITED, Ayabe (JP)

(72) Inventors: Akira Wakasugi, Kyoto (JP); Toshiya Hirotomi, Kyoto (JP); Yoichi Imura, Kyoto (JP)

(73) Assignee: GUNZE LIMITED, Kyoto (JP)

( * ) Notice: Subject to any disclaimer, the term of this patent is extended or adjusted under 35 U.S.C. 154(b) by 715 days.

(21) Appl. No.: 17/908,860

(22) PCT Filed: Mar. 19, 2021

(86) PCT No.: PCT/JP2021/011388
§ 371 (c)(1),
(2) Date: Sep. 1, 2022

(87) PCT Pub. No.: WO2021/187619
PCT Pub. Date: Sep. 23, 2021

(65) Prior Publication Data
US 2023/0110807 A1  Apr. 13, 2023

(30) Foreign Application Priority Data

Mar. 19, 2020  (JP) .................................. 2020-048548

(51) Int. Cl.
| | |
|---|---|
| *A61L 15/26* | (2006.01) |
| *A61L 27/58* | (2006.01) |
| *D04H 3/105* | (2012.01) |
| *D04H 3/16* | (2006.01) |

(52) U.S. Cl.
CPC ............... *A61L 15/26* (2013.01); *A61L 27/58* (2013.01); *D04H 3/105* (2013.01); *D04H 3/16* (2013.01); *D10B 2331/041* (2013.01); *D10B 2509/00* (2013.01)

(58) Field of Classification Search
CPC .......... A61L 15/26; D04H 3/105; D04H 3/16; D10B 2331/041; D10B 2509/00
See application file for complete search history.

(56) References Cited

U.S. PATENT DOCUMENTS 4,651,725 A * 3/1987 Kifune .................... A61L 15/28
424/443
2011/0038911 A1  2/2011 Sakamoto et al.
2017/0312395 A1  11/2017 Arimura et al.
(Continued)

FOREIGN PATENT DOCUMENTS

| JP | 61-240963 | 10/1986 |
|---|---|---|
| JP | 05-076586 | 3/1993 |
| JP | 10-337302 | * 12/1998 |

(Continued)

*Primary Examiner* — Blessing M Fubara
(74) *Attorney, Agent, or Firm* — HSML P.C.

(57) ABSTRACT

The present invention aims to provide a tissue reinforcement material having water absorbency and high stretchability. Provided is a tissue reinforcement material including a non-woven fabric containing polyglycolide, wherein the tissue reinforcement material has an average fiber diameter of 0.5 µm or more and 7.0 µm or less, an areal density of 1.0 $g/m^2$ or more and 50 $g/m^2$ or less, and a flexural rigidity (B value) measured with a pure bending tester of 0.001 $gf·cm^2/cm$ or more and 0.01 $gf·cm^2/cm$ or less.

3 Claims, 2 Drawing Sheets

Example 1

Comparative Example 1

Comparative Example 2

Reference Example 1

(56) References Cited

U.S. PATENT DOCUMENTS

2020/0002862 A1* 1/2020 Nakano .................. D04H 3/14

FOREIGN PATENT DOCUMENTS

| JP | 2001011767 | * | 1/2001 |
| JP | 2005278837 | * | 10/2005 |
| JP | 2014-083106 | | 5/2014 |
| JP | 2014083106 A | * | 5/2014 |
| JP | 2016-146854 | | 8/2016 |
| JP | 2019-141500 | | 8/2019 |

* cited by examiner

Example 1

Comparative Example 1

Comparative Example 2

Reference Example 1

Example 1

Comparative Example 1

Comparative Example 2

Reference Example 1

STRUCTURE REINFORCING MATERIAL

TECHNICAL FIELD

The present invention relates to tissue reinforcement materials having water absorbency and high stretchability.

BACKGROUND ART

In surgically removing a part of a biological tissue, postoperative bleeding from the resection surface or leakage of bodily fluid, such as bile, causes postoperative complications. In resecting a tissue such as the lung, prevention of leakage of air from the resection surface is required. To prevent such leakage of body fluids or air, tissue reinforcement materials made of bioabsorbable non-woven fabrics are used. For example, non-woven fabrics made of bioabsorbable materials such as one disclosed in Patent Literature 1 have been proposed as tissue reinforcement materials. Non-woven fabrics made of bioabsorbable materials can be used as reinforcement materials for vulnerable tissues to prevent tissue tears and prevent leakage of air or body fluids. They are decomposed after a certain period and absorbed in the living body, thus advantageously eliminating the need for removal by another operation. They also have stretchability to conform to the movements of tissues and are less likely to separate from tissues.

CITATION LIST

Patent Literature

Patent Literature 1: JP H5-076586 A
Patent Literature 2: JP 2014-083106 A
Patent Literature 3: JP 2016-146854 A

SUMMARY OF INVENTION

Technical Problem

However, conventional non-woven fabrics made of bioabsorbable materials as tissue reinforcement materials may not allow cell penetration as much as expected, and thus tissue regeneration may take time. In addition, the regenerated tissue may have insufficient structures or functions as compared with the actual tissue. To enhance tissue regenerating properties, some proposed tissue reinforcement materials include thin bioabsorbable non-woven fabrics having smaller average fiber diameters than conventional non-woven fabrics made of bioabsorbable materials (e.g., Patent Literatures 2 and 3). Such tissue reinforcement materials have excellent cell penetrability and can regenerate normal tissues. In addition, such tissue reinforcement materials can conform to fine irregularities on the tissue resection surface to further reduce leakage of air or bodily fluids. However, although tissue reinforcement materials made of thin bioabsorbable non-woven fabrics have excellent cell penetrability and excellent conformability to irregularities, they do not have sufficient stretchability, and have room for improvement when they are used to reinforce tissues that expand and contract, such as the lungs or the stomach.

Tissue reinforcement materials made of bioabsorbable non-woven fabrics have the advantage of being able to reinforce tissues by adhering to tissues by themselves through moisture in the body without the use of a separate adhesive. However, for reinforcement of organs where leakage of air or digestive fluids is a concern, tissue reinforcement materials are desirably more firmly bonded to tissues with fibrin glue. However, tissue reinforcement materials made of thin bioabsorbable non-woven fabrics are not much water absorptive, and this makes it difficult for them to contain enough fibrin glue.

In view of the above problems, the present invention aims to provide a tissue reinforcement material having water absorbency and high stretchability.

Solution to Problem

The present invention relates to a tissue reinforcement material including a non-woven fabric containing polyglycolide, wherein the tissue reinforcement material has an average fiber diameter of 0.5 µm or more and 7.0 µm or less, an areal density of 1.0 $g/m^2$ or more and 50 $g/m^2$ or less, and a flexural rigidity (B value) measured with a pure bending tester of 0.001 $gf·cm^2/cm$ or more and 0.01 $gf·cm^2/cm$ or less.

The present invention is described in detail below.

The present inventors made intensive studies to arrive at a non-woven fabric containing polyglycolide and having an average fiber diameter, an areal density, and a flexural rigidity (B value) within specific ranges. The inventors found out that such a non-woven fabric can provide a tissue reinforcement material having both high stretchability to conform to the movements of tissues and a degree of water absorbency sufficient to contain fibrin glue. The inventors thus completed the present invention.

The tissue reinforcement material of the present invention includes a non-woven fabric containing polyglycolide.

A tissue reinforcement material containing polyglycolide as a material can have sufficient strength for tissue reinforcement until the tissue heals, while being able to be quickly absorbed in the body after healing to reduce foreign body reaction.

The polyglycolide may have any weight average molecular weight, and preferably has a weight average molecular weight of 30000 or more and 200000 or less.

Polyglycolide having a weight average molecular weight of 30000 or more can further increase the strength of the resulting tissue reinforcement material. Polyglycolide having a weight average molecular weight of 200000 or less can be quickly absorbed after the tissue has healed. The weight average molecular weight of the polyglycolide is more preferably 50000 or more and is more preferably 150000 or less.

The tissue reinforcement material of the present invention has an average fiber diameter of 0.5 µm or more and 7.0 µm or less.

When the non-woven fabric constituting the tissue reinforcement material has an average fiber diameter in the range, the tissue reinforcement material can achieve all of conformability to fine irregularities of biological tissues, handleability, and a reinforcing effect. The average fiber diameter is preferably 1.0 µm or more, more preferably 1.5 µm or more, and is preferably 5.0 µm or less, more preferably 3.0 µm or less. The average fiber diameter can be adjusted by adjusting the production conditions for the non-woven fabric.

The average fiber diameter herein means the average fiber diameter determined by cutting out a part of the center of the tissue reinforcement material, measuring the fiber diameter at randomly selected ten sites of the part with an electron microscope, and averaging the measurement results.

The tissue reinforcement material of the present invention has an areal density of 1.0 $g/m^2$ or more and 50 $g/m^2$ or less.

A non-woven fabric having an average fiber diameter and an areal density in the above ranges has a cotton-like structure. This results in high stretchability not found in conventional tissue reinforcement materials made of bioabsorbable non-woven fabrics. The cotton-like structure also increases water absorbency, which allows the tissue reinforcement material to contain sufficient fibrin glue to firmly secure the tissue reinforcement material to the affected area. In addition, the increased water absorbency allows the material to contain more bodily fluid when it is implanted in the body, giving the cells penetrating the tissue reinforcement material easy access to the nutrients in the bodily fluid. This can improve tissue regenerating properties. In addition, the van der Waals forces of the absorbed bodily fluid can increase adhesion. Furthermore, the areal density smaller than that of conventional tissue reinforcement materials makes it possible to reduce pH fluctuations when the tissue reinforcement material is decomposed. This can further improve tissue regenerating properties. The areal density is preferably 3.0 g/m$^2$ or more, more preferably 5.0 g/m$^2$ or more, and is preferably 45 g/m$^2$ or less, more preferably 40 g/m$^2$ or less. The areal density can be adjusted by adjusting the production conditions for the non-woven fabric.

The areal density can be measured by JIS L-1913 Determination of mass per unit area (ISO method).

The tissue reinforcement material of the present invention has a flexural rigidity (B value) of 0.001 gf·cm$^2$/cm or more and 0.01 gf·cm$^2$/cm or less.

When the non-woven fabric constituting the tissue reinforcement material has a flexural rigidity (B value) in the range, the tissue reinforcement material can conform to fine irregularities of the affected area and thus can have increased adhesion to tissues. The flexural rigidity (B value) is preferably 0.002 gf·cm$^2$/cm or more and is preferably 0.007 gf·cm$^2$/cm or less. The flexural rigidity (B value) can be adjusted by, for example, needle punching the non-woven fabric. The flexural rigidity (B value) herein refers to a value obtained by measuring fabric texture called KES. Specifically, the flexural rigidity (B value) can be measured by the following method.

A measurement sample (10 cm×10 cm) is cut out from the center of the tissue reinforcement material. The flexural rigidity (B value) of the measurement sample is measured using a pure bending tester (e.g., KES-FB2-A produced by Kato Tech Co., Ltd.).

The tissue reinforcement material of the present invention preferably has a rigidity of 0.1 N/mm or more and 3.0 N/mm or less.

When the non-woven fabric constituting the tissue reinforcement material has a rigidity in the range, the tissue reinforcement material can conform to fine irregularities of the affected area while ensuring its strength as a tissue reinforcement material, thus preventing separation of the tissue reinforcement material from a tissue. The rigidity is more preferably 2.5 N/mm or less. The rigidity can be adjusted by, for example, needle punching the non-woven fabric. The rigidity can specifically be measured by the following method.

Five sheets (2.0 cm×5.0 cm) are cut out from the tissue reinforcement material such that the MD of the material correspond to the short sides to prepare measurement samples. Each of the obtained measurement samples is subjected to a tensile test using a compact table-top tester (AG-Xplus, produced by SHIMADZU Corporation) at 23° C., a chuck distance of 20 mm, and a tensile speed of 10 mm/sec to measure the Young's modulus when the sample is stretched from 0.5 mm (2.5%) to 1 mm (5%). The MD herein means the machine direction (the direction in which the conveyor travels) in the production of the non-woven fabric.

The tissue reinforcement material of the present invention may have any thickness, and preferably has a thickness of 30 μm or more and 300 μm or less.

A tissue reinforcement material having a thickness in the range can achieve an excellent balance between strength and conformability to fine irregularities of the affected area. The thickness of the tissue reinforcement material is more preferably 50 μm or more and is more preferably 200 μm or less.

The method of producing the tissue reinforcement material of the present invention is not limited as long as the ranges for the average fiber diameter, the areal density, and the flexural rigidity (B value) are satisfied. To satisfy the parameters easily, the tissue reinforcement material is preferably produced by a method including producing a non-woven fabric containing polyglycolide by a melt blowing method and then needle punching the non-woven fabric.

The present invention also encompasses a method of producing the tissue reinforcement material of the present invention, including producing a non-woven fabric containing polyglycolide by a melt blowing method and needle punching the non-woven fabric, wherein in the producing the non-woven fabric, a distance between a nozzle and a conveyor is 15 cm or more and 80 cm or less, and a nozzle temperature is not lower than a melting point of the polyglycolide+20° C. and not higher than the melting point of the polyglycolide+50° C.

The method of producing the tissue reinforcement material of the present invention includes, first, producing a non-woven fabric containing polyglycolide by a melt blowing method.

In the method of producing the tissue reinforcement material of the present invention, melt blowing is performed under the conditions described below and then needle punching described below is performed to produce a non-woven fabric having an average fiber diameter, an areal density, and a flexural rigidity (B value) in the above ranges.

In the producing the non-woven fabric, a distance between a nozzle and a conveyor is 15 cm or more and 80 cm or less.

A distance between the nozzle and the conveyor in the above range and a nozzle temperature described later enable deposition of polyglycolide on the conveyor with a cotton-like structure not found in conventional tissue reinforcement materials made of bioabsorbable non-woven fabrics. As a result, the average fiber diameter, the areal density, and the flexural rigidity (B value) can more easily satisfy the above ranges, resulting in a tissue reinforcement material having both water absorbency and high stretchability. The distance between the nozzle and the conveyor is preferably 20 cm or more, more preferably 30 cm or more, and is preferably 60 cm or less, more preferably 50 cm or less.

In the producing the non-woven fabric, a nozzle temperature is not lower than a melting point of the polyglycolide+20° C. and not higher than the melting point of the polyglycolide+50° C.

A nozzle temperature in the above range and a distance between the nozzle and the conveyor in the above range enable deposition of polyglycolide with a cotton-like structure on the conveyor, so that the average fiber diameter, the areal density, and the flexural rigidity (B value) can more easily satisfy the above ranges. The nozzle temperature is preferably not lower than a melting point of the polyglycolide+30° C. and is preferably not higher than the melting point of the polyglycolide+40° C.

In the producing the non-woven fabric, a conveyor travel speed is preferably 0.1 m/min or more and 10 m/min or less. A conveyor travel speed in the range makes it easier to adjust the areal density and the flexural rigidity (B value) to the above ranges. The conveyor speed is more preferably 0.3 m/min or more and is more preferably 5 m/min or less.

In the producing the non-woven fabric, a polymer discharge amount is preferably 0.05 kg/h or more and 0.5 kg/h or less. A polymer discharge amount in the range makes it easier to adjust the average fiber diameter to the above range. The polymer discharge amount is more preferably 0.1 kg/h or more and is more preferably 0.3 kg/h or less.

In the producing the non-woven fabric, an air velocity near a discharge outlet is preferably 1000 m/min or more and 4000 m/min or less. An air velocity in the range makes it easier to adjust the areal density and the flexural rigidity (B value) to the above ranges. The air velocity is more preferably 1500 m/min or more and is more preferably 3500 m/min or less.

The method of producing the tissue reinforcement material of the present invention includes, next, needle punching the non-woven fabric.

Needle punching the non-woven fabric obtained in the producing the non-woven fabric can increase the flexibility of the non-woven fabric, making it easy to satisfy the ranges of the flexural rigidity (B value) and the rigidity. This can further increase adhesion to fine irregularities. In addition, this can further increase water absorbency and stretchability. The specific conditions for the needle punching are not limited and may be conventionally known conditions.

The tissue reinforcement material of the present invention is applied after surgery to cover vulnerable tissue. The tissue reinforcement material of the present invention has higher water absorbency than conventional tissue reinforcement materials, enabling securer reinforcement of tissues using fibrin glue. The tissue reinforcement material of the present invention also has excellent stretchability. The tissue reinforcement material thus exhibits particularly high effects for tissues which greatly expand and contract and in which leakage of bodily fluid, digestive fluid, or air is a concern, such as the liver, the lungs, and the stomach.

Advantageous Effects of Invention

The present invention can provide a tissue reinforcement material having water absorbency and high stretchability.

DESCRIPTION OF EMBODIMENTS

Figure 1:
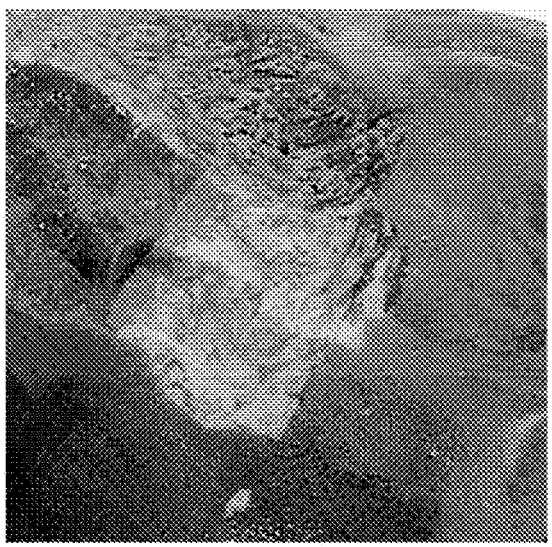
FIG. 1 shows photographs of evaluation samples after tissue expansion and contraction in an evaluation of conformability to the movements of a biological tissue.
Figure 1:
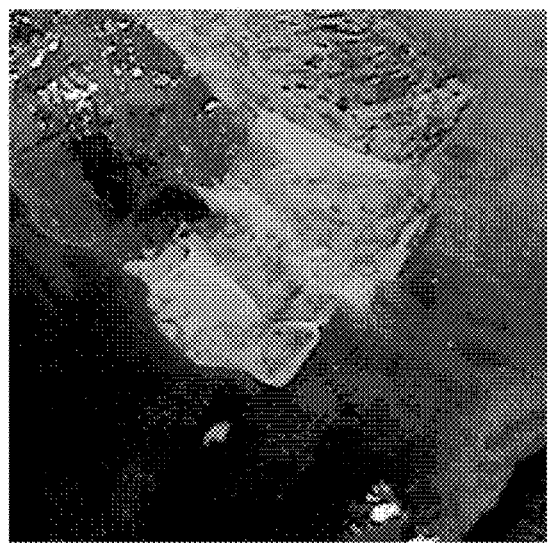
Figure 1:
Figure 1:
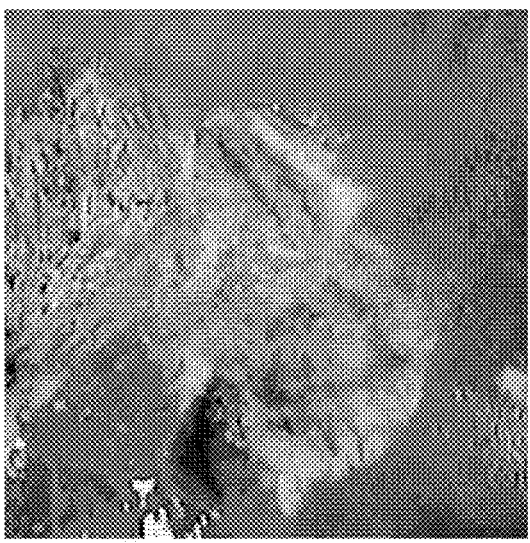

The following will describe embodiments of the present invention in detail, but the present invention should not be limited to these embodiments.

Example 1

Thread containing polyglycolide (weight average molecular weight: 120000, melting point: 223° C., glass transition point: 41° C.) was discharged by a melt blowing method to prepare a non-woven fabric having a thickness of 120 μm. Specific conditions for the melt blowing were as follows: a distance between the nozzle and the conveyor of 30 cm, a polymer discharge amount of 0.1 kg/h, an air velocity near the discharge outlet of 3000 m/min, a conveyor travel speed of 1.0 m/min, and a nozzle temperature of 260° C. Subsequently, the obtained non-woven fabric was needle punched to prepare a tissue reinforcement material.

Comparative Example 1

A tissue reinforcement material was produced as in Example 1 except that needle punching was not performed.

Comparative Example 2

A tissue reinforcement material was produced as in Example 1 except that the distance between the nozzle and the conveyor was 10 cm, and that needle punching was not performed.

Reference Example 1

A commercially available bioabsorbable non-woven fabric (NEOVEIL NV-L-015G, produced by Gunze Ltd.) containing polyglycolide was used as it was.

NEOVEIL NV-L-015G is a 220-μm-thick bioabsorbable non-woven fabric produced by needle punching.

<Physical Properties>

The tissue reinforcement materials obtained in the example, the comparative examples, and the reference example were subjected to the following measurements. Table 1 shows the results.

(1) Measurement of Average Fiber Diameter

A measurement sample (1.0 cm×1.0 cm) was cut out from the center of the obtained tissue reinforcement material. An image of the obtained measurement sample magnified 3000-fold was captured using a scanning electron microscope (SEM). From the obtained image, 10 fiber portions were randomly selected, and the fiber diameter was measured. The results were averaged to determine the average fiber diameter.

(2) Measurement of Areal Density

Three sheets (5.0 cm×5.0 cm) were cut out from the center of the obtained tissue reinforcement material to prepare measurement samples. The areal density of each of the obtained measurement samples was measured using an analytical balance (AUX220, produced by SHIMADZU Corporation), and the average of the measurement results was used as the areal density of the tissue reinforcement material.

(3) Measurement of Flexural Rigidity (B Value)

A measurement sample (10 cm×10 cm) was cut out from the center of the obtained tissue reinforcement material. The flexural rigidity (B value) of the obtained measurement sample was measured using a pure bending tester (KES-FB2-A produced by Kato Tech Co., Ltd.).

(4) Measurement of Rigidity

Three sheets (2.0 cm×5.0 cm) were cut out from the obtained tissue reinforcement material such that the MD of the tissue reinforcement material corresponded to the short sides to prepare measurement samples. Each of the obtained measurement samples was subjected to a tensile test using a compact table-top tester (AG-Xplus, produced by SHIMADZU Corporation) at 23° C., a chuck distance of 20 mm, and a tensile speed of 10 mm/sec to measure the rigidity when the sample was stretched from 0.5 mm (2.5%) to 1 mm (5%). The average of the measurement results was used as the rigidity of the tissue reinforcement material.

<Evaluation>

The tissue reinforcement materials obtained in the example, the comparative examples, and the reference example were evaluated for the following items. The results of the evaluation of stretchability and the evaluation of absorbency were shown in Table 1. The results of the evaluation of conformability to the movements of a biological tissue were shown in FIG. 1.

(Evaluation of Stretchability)

Five sheets (2.0 cm×5.0 cm) were cut out from the tissue reinforcement material such that the MD of the tissue reinforcement material corresponded to the short sides to prepare measurement samples. Each of the obtained measurement samples was tested using a compact table-top tester (AG-Xplus, produced by SHIMADZU Corporation) to measure the elongation at the maximum tenacity from the tensile strength and the percentage of elongation in conformity with JIS L-1912. The results were averaged to evaluate stretchability.

(Evaluation of Water Absorbency)

In conformity with the water retention test specified in JIS L-1913, three sheets (100 mm×100 mm) were cut out from the center of the material to prepare measurement samples, and the mass of each measurement sample before the test was measured using an analytical balance (AUX220, produced by SHIMADZU Corporation). Subsequently, each measurement sample was immersed in water in a container for 15 minutes and taken out of the water to let the water drip off for one minute. The mass after the test was then measured. Based on the results, the water retention was calculated using the following equation, and the results of the three samples were averaged to evaluate water absorbency.

Water retention $W$ (%)=$((W1-W0)/W0) \times 100$ (W0: mass before the test, W1: mass after the test)

Figure 2:
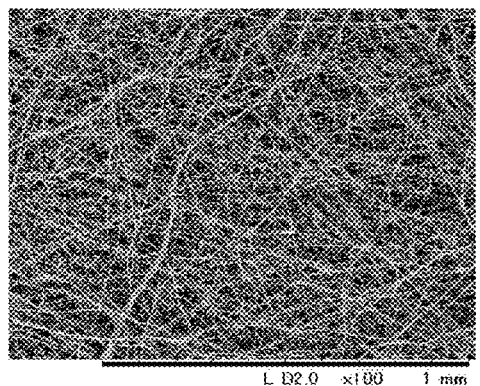
FIG. 2 shows photographs of tissue reinforcement materials obtained in examples magnified 100-fold using an electron microscope.
Figure 2:
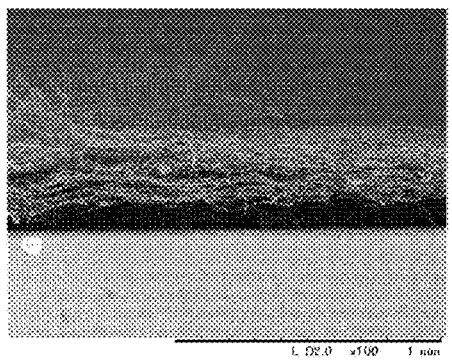
Figure 2:
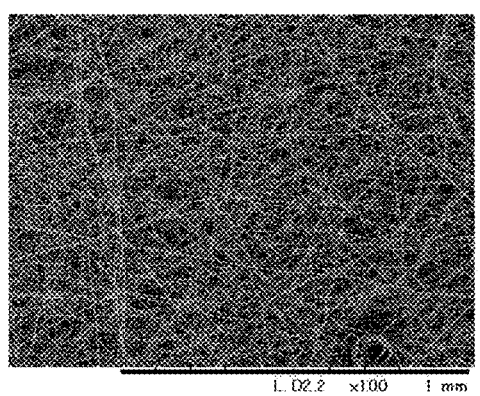
Figure 2:
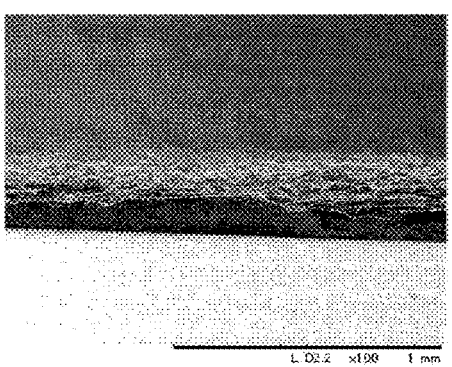
Figure 2:
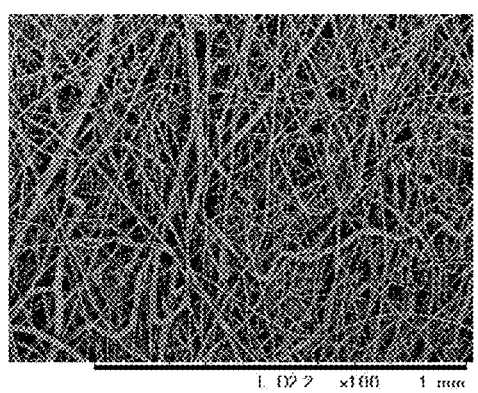
Figure 2:
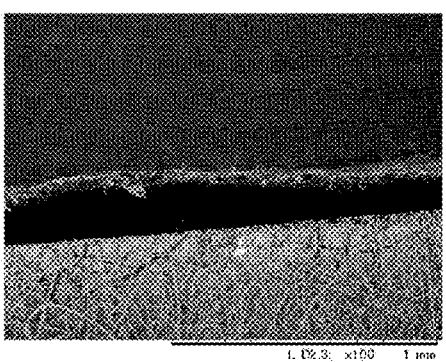
Figure 2:
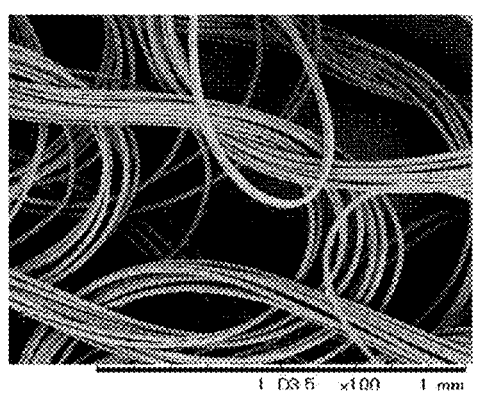
Figure 2:
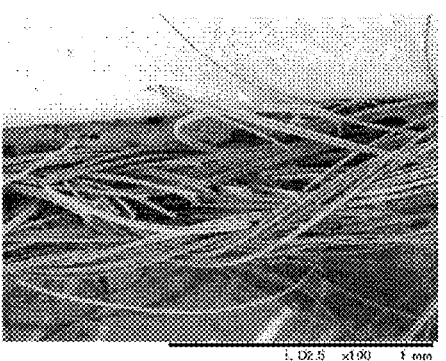

FIG. 2 shows photographs of the tissue reinforcement material obtained in the examples magnified 100-hold with an electron microscope (Miniscope TM-1000, produced by Hitachi High-Technologies Corporation). The image on the left shows the top surface of the tissue reinforcement material, and the image on the right shows a cross section. As clearly seen from FIG. 2, the material of Example 1 has a smaller average fiber diameter, a smaller areal density, and more gaps between fibers than the material of Reference 1 which is a conventional bioabsorbable non-woven fabric. The material of Example 1 thus has high water absorbency. It also has stretchability because the number of contact points between fibers is small. Furthermore, owing to needle punching of the non-woven fabric produced by melt blowing, the material of Example 1 also has increased flexibility, and thus has further improved adhesion to fine irregularities as well as further increased stretchability and water absorbency. In addition, owing to the small average fiber diameter, the material is preferable for a scaffold for cell proliferation and provides high tissue regenerating properties.

In contrast, the materials of Comparative Example 1 and Comparative Example 2, not subjected to needle punching, have lower adhesion to fine irregularities, lower stretchability, and lower water absorbency than the material of Example 1 even though they have a small average fiber diameter and a small areal density as the material of Example 1.

The material of Reference Example 1 has stretchability because, being produced by needle punching, it has non-fixed contact points between fibers and also because the number of contact points is small. However, the material of Reference Example 1 has a large average fiber diameter. Bioabsorbable non-woven fabrics having a small average fiber diameter have higher adhesion to fine irregularities and higher tissue regenerating properties.

TABLE 1

| | | Example 1 | Comparative Example 1 | Comparative Example 2 | Reference Example 1 |
|---|---|---|---|---|---|
| Physical properties | Average fiber diameter (μm) | 2.7 | 2.8 | 2.4 | 14.2 |
| | Areal density (g/m$^2$) | 9.7 | 10.1 | 11.7 | 27.9 |
| | Flexural rigidity (B value) (gf · cm$^2$/cm) | 0.0049 | 0.0153 | 0.0187 | 0.0177 |
| | Rigidity (N/mm) | 1.3 | 3.53 | 3.37 | 0.1 |
| Evaluation | Stretchability (%) | 68 | 35 | 23 | 220 |
| | Water absorbency (water retention) (%) | 2559 | 1151 | 591 | 664 |

(Evaluation of Conformability to the Movements of Biological Tissue)

An evaluation sample (50 mm×30 mm) was cut out from the center of the obtained tissue reinforcement material. Subsequently, the sample was gently placed on the liver of a sacrificed pig and pressed lightly several times from above with a moisturized gauze to wet the sample and attach the sample closely. The operation of expanding and contracting the liver about 20% was performed three times, and conformability to the movements was evaluated based on whether the sample separated from the liver. FIG. 1 shows photographs of the evaluation samples after expansion and contraction. FIG. 1 demonstrates that the evaluation sample of Example 1 did not separate from the liver, whereas the evaluation samples of Comparative Examples 1 and 2 partially lifted and separated from the liver. The sample of Reference Example 1 did not separate from the liver, but the sample of Example 1 was more firmly adhered.

INDUSTRIAL APPLICABILITY

The present invention can provide a tissue reinforcement material having water absorbency and high stretchability.

The invention claimed is:

1. A tissue reinforcement material comprising a non-woven fabric containing polyglycolide,
   wherein the tissue reinforcement material is obtained by:
   producing the non-woven fabric containing polyglycolide by a melt blowing method; and
   needle punching the non-woven fabric,
   wherein in the producing the non-woven fabric, a distance between a nozzle and a conveyor is 15 cm or more and 80 cm or less,
   a nozzle temperature is not lower than a melting point of the polyglycolide+20° C. and not higher than the melting point of the polyglycolide+50° C., the tissue reinforcement material has
an average fiber diameter of 0.5 μm or more and 7.0 μm or less,
an areal density of 1.0 g/m² or more and 50 g/m² or less, and
a flexural rigidity (B value) measured with a pure bending tester of 0.001 gf·cm²/cm or more and 0.01 gf·cm²/cm or less.

2. The tissue reinforcement material according to claim 1, having a rigidity of 0.1 N/mm or more and 3.0 N/mm or less.

3. The tissue reinforcement material according to claim 1, having a thickness of 30 μm or more and 300 μm or less.

* * * * *